(12) United States Patent
    Du

(10) Patent No.: US 12,633,537 B2
(45) Date of Patent: *May 19, 2026

(54) ELECTRODE ASSEMBLY, BATTERY CELL, BATTERY, ELECTRIC DEVICE, POSITIVE ELECTRODE PLATE, AND PREPARATION METHOD THEREOF

(71) Applicant: CONTEMPORARY AMPEREX TECHNOLOGY (HONG KONG) LIMITED, Hong Kong (CN)

(72) Inventor: Xianglong Du, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/035,689

(22) Filed: Jan. 23, 2025

(65) Prior Publication Data

US 2025/0167229 A1     May 22, 2025

Related U.S. Application Data

(63) Continuation of application No. PCT/CN2023/077159, filed on Feb. 20, 2023.

(51) Int. Cl.
    H01M 4/58        (2010.01)
    H01M 4/02        (2006.01)
        (Continued)

(52) U.S. Cl.
    CPC ............. H01M 4/58 (2013.01); H01M 4/136 (2013.01); H01M 4/364 (2013.01);
        (Continued)

(58) Field of Classification Search
    None
    See application file for complete search history.

(56) References Cited

U.S. PATENT DOCUMENTS

| | | | |
|---|---|---|---|
| 2002/0028380 A1 | 3/2002 | Tanjo et al. | |
| 2013/0045418 A1* | 2/2013 | Oguni ................... | H01M 4/139 |
| | | | 977/734 |
| 2015/0194664 A1 | 7/2015 | Saka et al. | |

FOREIGN PATENT DOCUMENTS

| | | | | |
|---|---|---|---|---|
| CN | 113097431 A | * | 7/2021 | ........ H01M 10/0525 |
| CN | 113097441 A | | 7/2021 | |
| | | (Continued) | | |

OTHER PUBLICATIONS

International Search Report dated Oct. 23, 2023 for application PCT /CN2023/077159.

(Continued)

*Primary Examiner* — Zhongqing Wei
(74) *Attorney, Agent, or Firm* — Ladas & Parry LLP

(57)        ABSTRACT

An electrode assembly, a battery cell, a battery, an electric device, a positive electrode plate, and a preparation method thereof are provided. The positive electrode plate includes: a positive electrode current collector; and a positive electrode active material layer, disposed on at least a part of a surface of the positive electrode current collector. The positive electrode active material layer includes at least two positive electrode active material segments arranged along a length direction of the positive electrode current collector, and a specific surface area of a positive electrode active material contained in a part of the at least two positive electrode active material segments is greater than a specific surface area of a positive electrode active material contained in another part of the at least two positive electrode active material segments.

14 Claims, 5 Drawing Sheets

(51) Int. Cl.
    *H01M 4/136*     (2010.01)
    *H01M 4/36*     (2006.01)
    *H01M 10/0525*     (2010.01)

(52) U.S. Cl.
    CPC ................. *H01M 2004/021* (2013.01); *H01M 2004/028* (2013.01); *H01M 10/0525* (2013.01)

(56) References Cited

FOREIGN PATENT DOCUMENTS

| | | | | |
|---|---|---|---|---|
| CN | 213878153 | U | 8/2021 | |
| CN | 112186273 | B | 3/2022 | |
| CN | 217719660 | U | 11/2022 | |
| EP | 3961750 | A1 * | 3/2022 | ........ H01M 10/0525 |
| EP | 4550438 | A1 | 5/2025 | |

OTHER PUBLICATIONS

Extended European Search Report for EP application No. 23923247.
3, dated Sep. 26, 2025.

\* cited by examiner

50

40

40

41

42

300

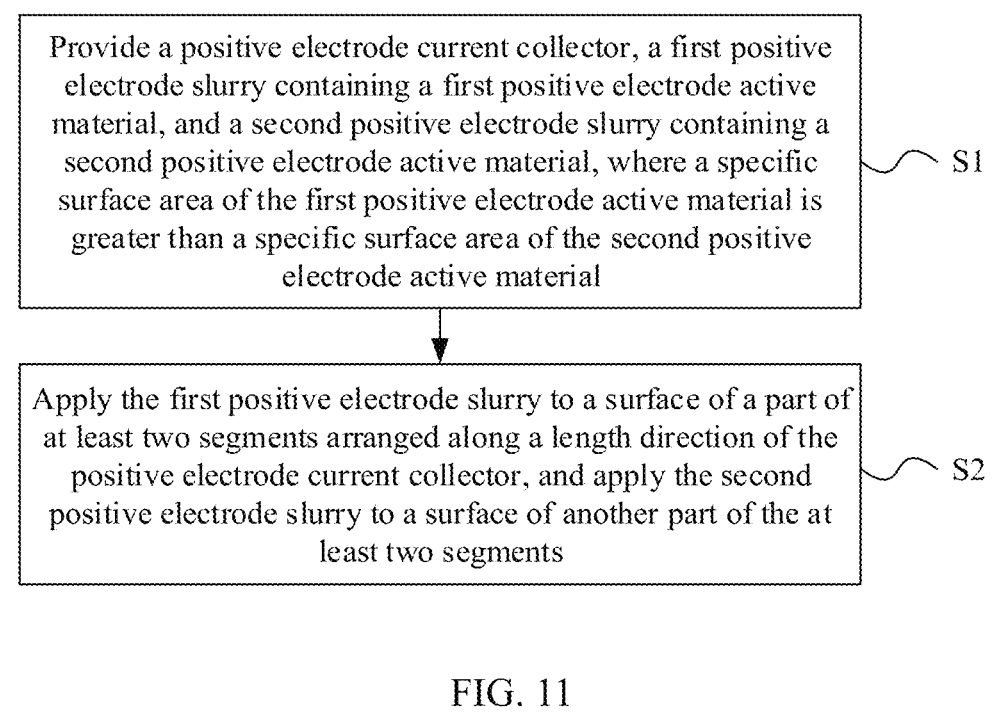

Provide a positive electrode current collector, a first positive electrode slurry containing a first positive electrode active material, and a second positive electrode slurry containing a second positive electrode active material, where a specific surface area of the first positive electrode active material is greater than a specific surface area of the second positive electrode active material — S1

Apply the first positive electrode slurry to a surface of a part of at least two segments arranged along a length direction of the positive electrode current collector, and apply the second positive electrode slurry to a surface of another part of the at least two segments — S2

FIG. 11

ELECTRODE ASSEMBLY, BATTERY CELL, BATTERY, ELECTRIC DEVICE, POSITIVE ELECTRODE PLATE, AND PREPARATION METHOD THEREOF

CROSS REFERENCE TO RELATED APPLICATIONS

This application is a continuation of International application PCT/CN2023/077159 filed on Feb. 20, 2023, the subject matter of which is incorporated by reference in its entirety.

TECHNICAL FIELD

This disclosure relates to the field of battery technology, and in particular, to an electrode assembly, a battery cell, a battery, an electric device, a positive electrode plate, and a preparation method thereof.

BACKGROUND

Secondary batteries, especially lithium-ion batteries, have the advantages such as high voltage, high specific energy density, long cycle life, environmental friendliness, wide operating temperature range, and low self-discharge. Therefore, they have been widely used in power devices of portable electronic devices and large-scale new energy electric vehicles, playing a significant role in addressing human environmental pollution and energy crisis. With the widespread application of secondary batteries, the cycling performance and safety of batteries have become major concerns of users.

SUMMARY

According to an aspect of this disclosure, a positive electrode plate is provided, including: a positive electrode current collector; and a positive electrode active material layer disposed on at least a part of a surface of the positive electrode current collector; where the positive electrode active material layer includes at least two positive electrode active material segments arranged along a length direction of the positive electrode current collector, a specific surface area of the positive electrode active material contained in a part of the at least two positive electrode active material segments is greater than a specific surface area of a positive electrode active material contained in another part of the at least two positive electrode active material segments.

Depending on the compression on different parts of the positive electrode plate when the battery cell swells during operation, the specific surface area of the positive electrode active material contained in a part of the positive electrode active material segments in the positive electrode active material layer is made larger to improve the electrolyte infiltration capacity of the positive electrode active material region with high compression, and reduce the risk of lithium precipitation caused by the electrolyte being squeezed out. This allows the electrolyte to fully react with the positive electrode active material on the positive electrode plate during the charge and discharge process of the battery, thereby optimizing the cycling performance of the battery and improving the safety of the battery.

In some embodiments, the at least two positive electrode active material segments include a first positive electrode active material segment and a second positive electrode active material segment, a specific surface area $BET_1$ of a first positive electrode active material contained in the first positive electrode active material segment is greater than a specific surface area $BET_2$ of a second positive electrode active material contained in the second positive electrode active material segment, and the first positive electrode active material segment is closer to a winding starting end of the positive electrode plate than the second positive electrode active material segment.

Considering that when the positive electrode plate is applied to a wound electrode assembly, the electrode plate layer closer to the winding center and is more severely compressed by swelling of the battery cell during operation, the specific surface area of the first positive electrode active material contained in the first positive electrode active material segment closer to the winding starting end is made larger to allow for stronger electrolyte infiltration capacity, so that a certain amount of electrolyte can still be retained under high compression. This can reduce the risk of lithium precipitation caused by lack of electrolyte, optimize the cycling performance of the battery, and improve the safety of the battery.

In some embodiments, an end portion of the first positive electrode active material segment adjacent to the winding starting end of the positive electrode plate is flush with the winding starting end of the positive electrode plate.

With the end portion of the first positive electrode active material segment flush with the winding starting end, it is unnecessary to accurately set the coating position of the first positive electrode active material segment on a side near the winding starting end, helping to reduce the difficulty in forming the first positive electrode active material segment on the positive electrode current collector by coating.

In some embodiments, the at least two positive electrode active material segments further include a third positive electrode active material segment, the third positive electrode active material segment is located on a side of the first positive electrode active material segment far from the second positive electrode active material segment, and the specific surface area $BET_1$ of the first positive electrode active material contained in the first positive electrode active material segment is greater than a specific surface area $BET_3$ of a third positive electrode active material contained in the third positive electrode active material segment.

Considering that for some wound electrode assemblies, the positive electrode plate has a hollow structure, the electrode plate segment near the center position is less compressed when the battery cell swells during operation. Arranging the first positive electrode active material with a relatively small specific surface area on the side of the first positive electrode active material segment close to the winding starting end is conducive to reducing costs by reducing the amount of the first positive electrode active material used.

In some embodiments, the third positive electrode active material contained in the third positive electrode active material segment is the same as the second positive electrode active material contained in the second positive electrode active material segment.

Using the same positive electrode active material for the second positive electrode active material segment and the third positive electrode active material segment can simplify the electrode plate processing procedures.

In some embodiments, the specific surface area $BET_1$ of the first positive electrode active material satisfies: $BET_1 \geq 12$ $m^2/g$.

With the specific surface area $BET_1$ of the first positive electrode active material greater than or equal to 12 $m^2/g$, the material pores of the first positive electrode active material with a relatively large specific surface area can accommodate more electrolyte during the cycling process, which helps to alleviate the difficulty of insufficient infiltration, reduce the risk of lithium precipitation, and improve the cycle life of the battery.

In some embodiments, the specific surface area $BET_1$ of the first positive electrode active material satisfies: 14 $m^2/g \leq BET_1 \leq 23$ $m^2/g$.

With the specific surface area $BET_1$ of the first positive electrode active material satisfying the further preferred range of 14 $m^2/g \leq BET_1 \leq 23$ $m^2/g$, it is possible to improve the stability of the positive electrode active material while improving the cycle life of the battery, thereby enhancing the safety performance of the battery.

In some embodiments, the specific surface area $BET_2$ of the second positive electrode active material satisfies: $BET_2 < 12$ $m^2/g$.

With the specific surface area $BET_2$ of the second positive electrode active material less than 12 $m^2/g$, it is conducive to using a positive electrode active material with a smaller specific surface area and lower cost to form the second positive electrode active material segment, thereby reducing the overall cost of the positive electrode plate.

In some embodiments, the specific surface area $BET_2$ of the second positive electrode active material satisfies: 2 $m^2/g \leq BET_2 \leq 10$ $m^2/g$.

With the specific surface area $BET_2$ of the second positive electrode active material satisfying the further preferred range of 2 $m^2/g \leq BET_2 \leq 10$ $m^2/g$, the overall cost of the positive electrode plate can be effectively reduced.

In some embodiments, a median particle size $D_v50_1$ of the first positive electrode active material is less than a median particle size $D_v50_2$ of the second positive electrode active material.

Considering that when the positive electrode plate is applied to a wound electrode assembly, the electrode plate layer closer to the winding center is more severely compressed by swelling of the battery cell during operation, the median particle size of the first positive electrode active material contained in the first positive electrode active material segment closer to the winding starting end is made larger to allow for stronger electrolyte infiltration capacity, so that a certain amount of electrolyte can still be retained under high compression. This can reduce the risk of lithium precipitation caused by lack of electrolyte, and optimize the cycling performance of the battery.

In some embodiments, the median particle size $D_v50_1$ of the first positive electrode active material satisfies: $D_v50_1 \leq 800$ nm.

With the median particle size $D_v50_1$ of the first positive electrode active material less than or equal to 800 nm, the material pores of the first positive electrode active material with a relatively small median particle size can accommodate more electrolyte during the cycling process, which helps to alleviate the difficulty of insufficient infiltration, reduce the risk of lithium precipitation, and improve the cycle life of the battery.

In some embodiments, the median particle size $D_v50_1$ of the first positive electrode active material satisfies: 100 $nm \leq D_v50_1 \leq 400$ nm.

With the median particle size $D_v50_1$ of the first positive electrode active material satisfying the further preferred range of 100 $nm \leq D_v50_1 \leq 400$ nm, it is possible to alleviate the local lithium precipitation and improve the cycle life of the battery, as well as improving the electrochemical kinetics performance during the charge and discharge process of the battery and reducing polarization.

In some embodiments, the median particle size $D_v50_2$ of the second positive electrode active material satisfies: $D_v50_2 > 800$ nm.

With the median particle size $D_v50_2$ of the second positive electrode active material greater than 800 nm, it is conducive to using a positive electrode active material with a relatively large median particle size and low cost to form the second positive electrode active material segment, thereby reducing the overall cost of the positive electrode plate.

In some embodiments, the median particle size $D_v50_2$ of the second positive electrode active material satisfies: 900 $nm \leq D_v50_2 \leq 1500$ nm.

With the median particle size $D_v50_2$ of the second positive electrode active material satisfying the further preferred range of 900 $nm \leq D_v50_2 \leq 1500$ nm, the overall cost of the positive electrode plate can be effectively reduced.

In some embodiments, a carbon content $\omega C_1$ of the first positive electrode active material is greater than a carbon content $\omega C_2$ of the second positive electrode active material.

Considering that when the positive electrode plate is applied to a wound electrode assembly, the electrode plate layer closer to the winding center is more severely compressed by swelling of the battery cell during operation, lithium precipitation is likely to occur. The first positive electrode active material contained in the first positive electrode active material segment closer to the winding starting end has a larger carbon content, which improves the conductivity of the electrode plate, reduces the risk of lithium precipitation, and optimizes the charge-discharge performance of the battery.

In some embodiments, the carbon content $\omega C_1$ of the first positive electrode active material satisfies: $\omega C_1 \geq 2.5\%$.

With the carbon content $\omega C_1$ of the first positive electrode active material greater than or equal to 2.5%, the first positive electrode active material with a relatively high carbon content can achieve high conductivity, which helps to reduce the risk of lithium precipitation, improve the cycle life of the battery, reduce the internal resistance of the battery, and enhance the cycling performance of the battery.

In some embodiments, the carbon content $\omega C_1$ of the first positive electrode active material satisfies: $\omega C_1 \geq 2.8\%$.

With the carbon content $\omega C_1$ of the first positive electrode active material satisfying the further preferred range of $\omega C_1 \geq 2.8\%$, the conductivity of the electrode plate can be further effectively improved, the internal resistance of the battery can be reduced, and the cycle life of the battery can be improved.

In some embodiments, the carbon content $\omega C_2$ of the second positive electrode active material satisfies: $\omega C_2 \leq 1.5\%$.

With the carbon content $\omega C_2$ of the second positive electrode active material less than or equal to 1.5%, the proportion of the positive electrode active material can be increased, and the energy density can be improved.

In some embodiments, the carbon content $\omega C_2$ of the second positive electrode active material satisfies: $\omega C_2 \leq 1.2\%$.

With the carbon content $\omega C_2$ of the second positive electrode active material further satisfying $\omega C_2 \leq 1.2\%$, the proportion of the positive electrode active material can be effectively increased, and the energy density can be improved.

In some embodiments, in the length direction of the positive electrode current collector, a ratio $L1/L$ of a length L1 of the first positive electrode active material segment to a length L of the positive electrode current collector satisfies: $0<L1/L\leq0.5$.

L1/L corresponds to a coverage proportion of the positive electrode active material in the length direction of the entire positive electrode current collector. If this proportion is too low, the improvement to the electrolyte infiltration capacity is limited, and the risk of lithium precipitation due to the electrolyte being squeezed out cannot be effectively reduced. If this proportion is too high, a larger amount of the first positive electrode active material is needed, which is likely to cause high costs. With L1/L satisfying $0<L1/L\leq0.5$, the risk of lithium precipitation on the electrode plate is reduced, the cycling performance of the battery is optimized, and the overall cost is reduced.

In some embodiments, the ratio L1/L satisfies: $0.3\leq L1/L\leq0.5$.

With L1/L further satisfying $0.3\leq L1/L\leq0.5$, the risk of lithium precipitation on the electrode plate can be more effectively reduced, the cycling performance of the battery can be optimized, and the overall cost can be reduced.

In some embodiments, the first positive electrode active material includes nano lithium iron phosphate, and the second positive electrode active material includes lithium iron phosphate.

Herein, the first positive electrode active material includes nano lithium iron phosphate, and the second positive electrode active material includes lithium iron phosphate, preventing excessive performance differences between the first positive electrode active material segment and second positive electrode active material segment of the positive electrode plate.

According to an aspect of this disclosure, an electrode assembly is provided, including: a positive electrode plate, a negative electrode plate, and a separator disposed between the positive electrode plate and the negative electrode plate, where the positive electrode plate, the separator, and the negative electrode plate are wound along a winding direction to form a winding structure, and the positive electrode plate is the foregoing positive electrode plate. The electrode assembly using the foregoing positive electrode plate has better cycling performance and safety.

In some embodiments, the winding structure is a cylindrical structure.

For a cylindrical electrode assembly, the foregoing positive electrode plate can improve the electrolyte infiltration effect at the positions with concentrated swelling force, thereby enhancing the cycling performance and safety of the electrode assembly.

According to an aspect of this disclosure, a battery cell is provided, including the foregoing electrode assembly. The battery cell using the foregoing electrode assembly has better cycling performance and safety.

According to an aspect of this disclosure, a battery is provided, including the foregoing battery cell. The battery using the foregoing battery cell has better cycling performance and safety.

According to an aspect of this disclosure, an electric device is provided, including the foregoing battery. The electric device using the foregoing battery can achieve better safety and reduced battery consumption.

According to an aspect of this disclosure, a preparation method of positive electrode plate is provided, including:

providing a positive electrode current collector, a first positive electrode slurry containing a first positive electrode active material, and a second positive electrode slurry containing a second positive electrode active material, where a specific surface area of the first positive electrode active material is greater than a specific surface area of the second positive electrode active material; and applying the first positive electrode slurry to a surface of a part of at least two segments arranged along a length direction of the positive electrode current collector, and applying the second positive electrode slurry to a surface of another part of the at least two segments arranged along the length direction of the positive electrode current collector.

The first positive electrode slurry containing the first positive electrode active material and the second positive electrode slurry containing the second positive electrode active material are applied to surfaces of different segments of the positive electrode current collector in the length direction, so that the resulting positive electrode plate can improve the electrolyte infiltration capacity of the positive electrode active material region with high compression, and reduce the risk of lithium precipitation caused by the electrolyte being squeezing out. This allows the electrolyte to fully react with the positive electrode active material on the positive electrode plate during the charge and discharge process of the battery, thereby optimizing the cycling performance of the battery and improving the safety of the battery.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings described below show merely some embodiments of this disclosure, and persons of ordinary skill in the art may still derive other drawings from the accompanying drawings without creative efforts.

With reference to the accompanying drawings, this disclosure can be more clearly understood based on the following detailed descriptions.

FIG. 11 is a schematic flowchart of a preparation method of positive electrode plate according to some embodiments of this disclosure.

Figure 1:
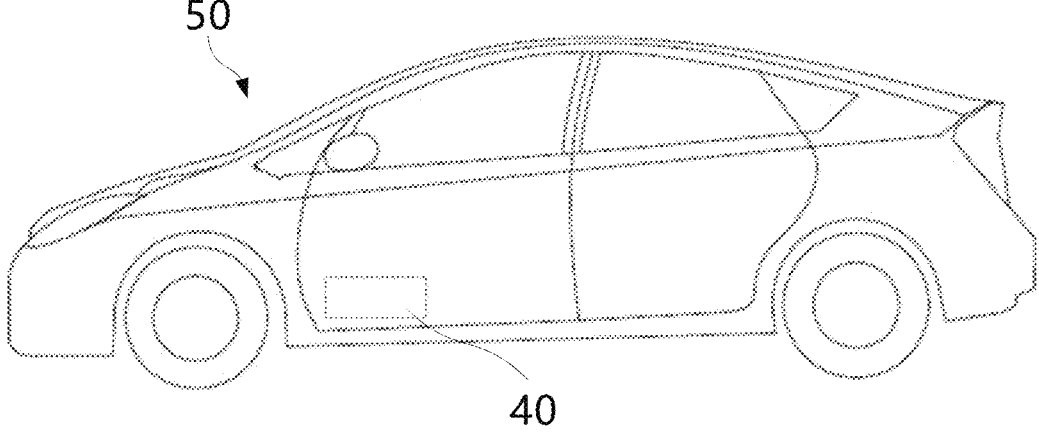
FIG. 1 is a schematic structural diagram of an electric device according to some embodiments of this disclosure.

It should be understood that sizes of various parts shown in the accompanying drawings are not drawn to scale. Additionally, the same or similar reference signs denote the same or similar components.

DESCRIPTION OF REFERENCE SIGNS

10. positive electrode current collector;

20. positive electrode active material layer; 21. first positive electrode active material segment; 22. second positive electrode active material segment; 23. third positive electrode active material segment;

30. electrode assembly; 31. positive electrode plate; 32. negative electrode plate; 33. separator; 34. housing; 35. end cover; 36. current collecting plate; 300. battery cell;

40. battery; 41. box; 42. end cover; and

50. vehicle.

DETAILED DESCRIPTION

The following further describes the embodiments of this disclosure in detail with reference to the accompanying drawings and embodiments. The detailed description and accompanying drawings of the following embodiments are used to exemplarily illustrate the principle of this disclosure rather than to limit the scope of this disclosure, that is, this disclosure is not limited to the described embodiments.

In the descriptions of this disclosure, it should be noted that, unless otherwise stated, "a plurality of" means two or more; and the orientations or positional relationships indicated by the terms "upper", "lower", "left", "right", "inside", "outside", and the like are merely for ease and brevity of description of this disclosure rather than indicating or implying that the means or components mentioned must have specific orientations or must be constructed or manipulated according to particular orientations. These terms shall therefore not be construed as limitations on this disclosure. In addition, the terms "first", "second", "third", and the like are merely for the purpose of description and shall not be understood as any indication or implication of relative importance. "Perpendicular" is not strictly perpendicular, but within the allowable range of error. "Parallel" is not strictly parallel, but within the allowable range of error.

The orientation terms appearing in the following description all are directions shown in the figures, and do not limit the specific structure of this disclosure. In the descriptions of this disclosure, it should be further noted that unless otherwise specified and defined explicitly, the terms "mount", "connect", and "join" should be understood in their general senses. For example, they may refer to a fixed connection, a detachable connection, or an integrated connection, and they may refer to a direct connection or an indirect connection through an intermediate medium. Persons of ordinary skill in the art can understand specific meanings of the foregoing terms in this disclosure as appropriate to specific situations.

The following describes in detail some embodiments of the present invention with reference to the accompanying drawings. In absence of conflicts, the features in the following embodiments may be combined.

In the related art, a positive electrode plate is prepared by applying a single- or double-layer positive electrode active material on a surface of a positive electrode current collector. The positive electrode plate obtained using this preparation method can be used for the wound electrode assembly of a cylindrical battery. When the cylindrical battery is in a working cycle, the swelling pressure of the negative electrode plate and the stress on the electrode plate, some parts of the winding structure, such as the wound layer of the cylindrical battery closer to the center, are subjected to large swelling force, which easily causes the electrolyte infiltrated into the wound layer to be squeezed out. Moreover, due to the fact that the electrode tabs at the end portions of the electrode assembly are compact after being overlapped and bent, the electrolyte cannot quickly enter the interior of the electrode assembly for replenishment. Consequently, local lithium precipitation occurs at the positions with high swelling force inside the electrode assembly due to insufficient electrolyte infiltration and untimely intercalation, affecting the cycling performance and safety of the battery.

In view of this, some embodiments of this disclosure provide an electrode assembly, a battery cell, a battery, an electric device, a positive electrode plate, and a preparation method thereof, to improve battery performance.

The positive electrode plate in some embodiments of this disclosure can be applied to various types of electrode assemblies, including wound electrode assemblies and stacked electrode assemblies, which are not limited in the embodiments of this application.

The electrode assembly in some embodiments of this disclosure can be applied to various types of battery cells. A battery cell may include a lithium-ion secondary battery, a lithium-ion primary battery, a lithium-sulfur battery, a sodium/lithium-ion battery, a sodium-ion battery, a magnesium-ion battery, and the like, which is not limited in the embodiments of this disclosure. The battery cell may be cylindrical, flat, or cuboid, or of other shapes, which is not limited in the embodiments of this application. In terms of packaging methods, battery cells are typically divided into cylindrical cell, prismatic cell, and pouch cell, which is not limited in the embodiments of this application.

The battery cell in some embodiments of this disclosure can be applied to varies types of batteries. The battery can be used to supply power for electric devices such as vehicles, for example, to supply power for operating or driving vehicles. The battery may include a housing and a battery module, where the housing is configured to provide a space for accommodating the battery module, and the battery module is mounted inside the housing. The housing may be made of metal. The battery module may include a plurality of battery cells connected in series, parallel, or series-parallel. A battery cell is the smallest unit forming a battery. The battery cell includes an electrode assembly in which electrochemical reactions take place.

The battery in some embodiments of this disclosure can be applied to various types of electric devices that use batteries. The electric device may be a mobile phone, a portable device, a notebook computer, an electric bicycle, an electric vehicle, a ship, a spacecraft, an electric toy, an electric tool, and the like. For example, the spacecraft includes an airplane, a rocket, a space shuttle, and a spaceship. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer. The embodiments of this invention do not place special restrictions on the aforementioned electric devices.

FIG. 1 is a schematic structural diagram of an electric device according to some embodiments of this disclosure.

For convenience, the electric device is described taking a vehicle as an example. A vehicle 50 may be a fossil fuel vehicle, a natural-gas vehicle, or a new energy vehicle. The new energy vehicle may be a battery electric vehicle, a hybrid electric vehicle, or the like. For example, a battery 40 may be disposed at the bottom, front, or rear of the vehicle 50.

The battery 40 may be configured to supply power to the vehicle 50. For example, the battery 40 may be used as an operational power source for the vehicle 50 for use in a circuit system of the vehicle 50, for example, to satisfy power needs of start, navigation, and running of the vehicle 50. The battery 40 can be used not only as the operational power source for the vehicle 50, but also as a driving power source for the vehicle 50, replacing or partially replacing fossil fuel or natural gas to provide driving traction for the vehicle 50.

The vehicle 50 may also be provided with an axle, wheels, a motor, and a controller inside. The controller is configured to control power supply of the battery 40 to the motor. For example, when the vehicle 50 uses the battery 40 as a driving power source, the controller can provide traction required for uniform speed maintaining and acceleration of the motor. The motor is configured to drive the axle to rotate so as to drive the wheels to rotate.

Figure 2:
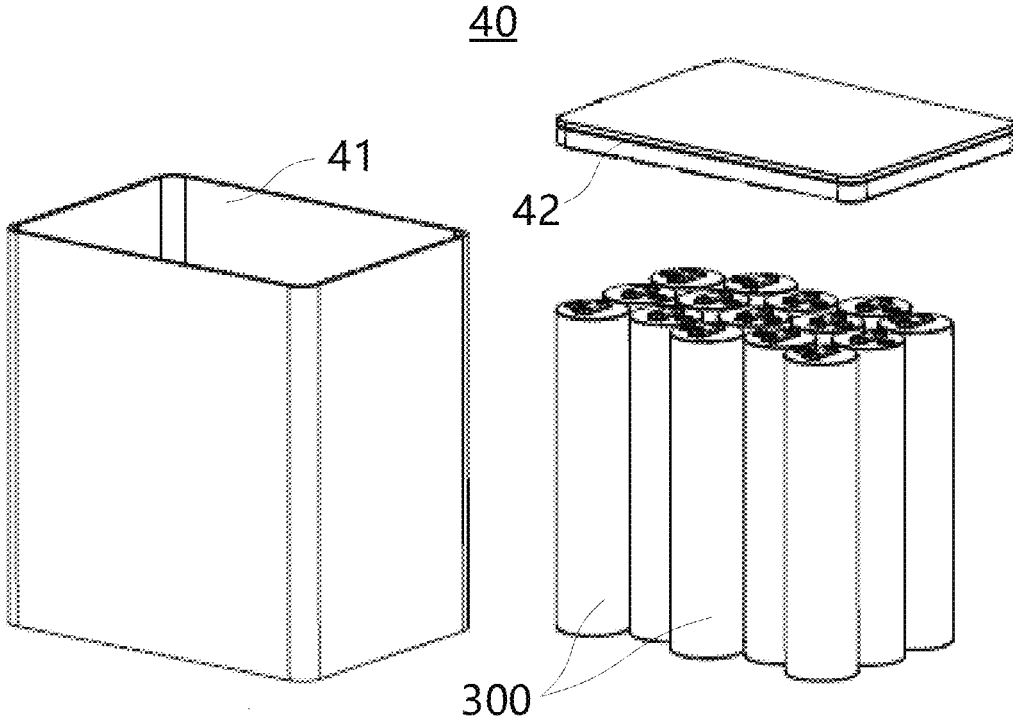
FIG. 2 is a schematic exploded view of a battery according to some embodiments of this disclosure.

FIG. 2 is a schematic exploded view of a battery according to some embodiments of this disclosure; Referring to FIG. 2, in some embodiments, the battery 40 includes a box 41 and one or more battery cells 300 disposed in the box 41. The box 41 can provide cooling, sealing, and impact protection functions for the battery cells 300, and can also prevent liquids or other foreign substances from adversely affecting the charge and discharge or safety of the battery cells.

Referring to FIG. 2, the battery cells 300 are electrically connected to each other, for example, in series, parallel, or series-parallel, to implement the desired electrical performance parameters of the battery 40. A plurality of battery cells 300 are arranged in rows, and one or more rows of battery cells 300 may be provided in the box as needed.

In some embodiments, all battery cells 300 of the battery 40 may be arranged in at least one of a length direction or a width direction of the box. At least one row or column of battery cells 300 may be provided based on actual needs. When needed, one or more layers of battery cells 300 may also be arranged in a height direction of the battery 40.

In some embodiments, the battery module may be first formed by connecting the plurality of battery cells 300 in series, parallel, or series-parallel, and then a plurality of battery modules are connected in series, parallel, or series-parallel to form an entirety which is accommodated in the box 41. In some other embodiments, all battery cells 300 are directly connected in series, or parallel, or series-parallel, and then the entity formed by all the battery cells 300 is accommodated in the box.

The battery cell 300 may include a housing, an end cover, and an electrode assembly. The housing has a cavity for accommodating the electrode assembly, and an end portion of the housing may be constructed to be open for arranging an end cover assembly. The electrode assembly is accommodated in the cavity of the housing. In addition to the electrode assembly, the end cover, and the housing, the battery cell 300 further includes an electrolyte.

Figure 3:
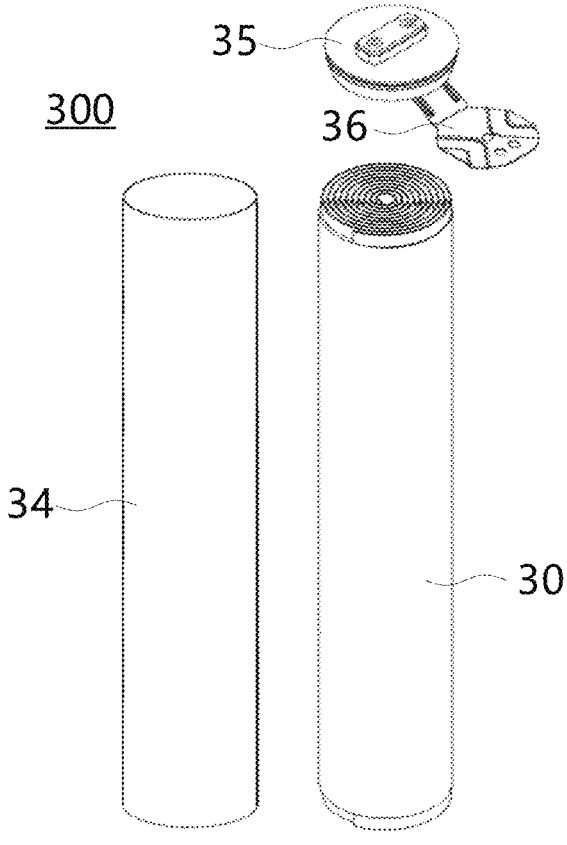
FIG. 3 is a schematic exploded view of a battery cell according to some embodiments of this disclosure.

FIG. 3 is a schematic exploded view of a battery cell according to some embodiments of this disclosure. Referring to FIG. 3, in some embodiments, the battery cell 300 may include a housing 34, an end cover 35, and an electrode assembly 30. The housing 34 has a cavity for accommodating the electrode assembly, and at least one end of the housing 34 may be configured to be open for arranging the end cover 35. In addition to the electrode assembly 30, the end cover 35, and the housing 34, the battery cell 300 further includes an electrolyte. The battery cell 300 may further include a current collecting plate 36. The current collecting plate 36 is located between the electrode tab of the electrode assembly 30 and the electrode pole on the end cover 35, and can be fixedly connected to the flattened electrode tab by welding.

The cavity of the housing 34 may be configured to accommodate the electrode assembly 30 and accommodate the electrolyte. The end opening of the housing 34 allows the electrode assembly 30 to enter the cavity through the end opening during the installation of the battery cell 300. The shape of the housing 34 can be determined based on the shape of one or more electrode assemblies 30 accommodated in the cavity. For example, the shape of the housing 34 may be a hollow cuboid, a hollow cube, or a hollow cylinder. The housing 34 may be made of metal (such as aluminum or aluminum alloy) or non-metallic material (plastic) with certain hardness and strength.

The end cover 35 is arranged at the end opening of the housing 34 to close the end opening and form a closed cavity with the housing 34 for accommodating the electrode assembly 30. The end cover 35 may be made of metal (such as aluminum or aluminum alloy) or non-metallic material (plastic) with certain hardness and strength. The end cover 35 and the housing 34 may be fixedly connected by welding, bonding, connection through connectors, or the like. Some functional components may be disposed on the end cover 35, such as an electrode pole for electrical connection to the electrode assembly 30, an electrolyte injection mechanism, and a pressure relief mechanism.

Figure 4:
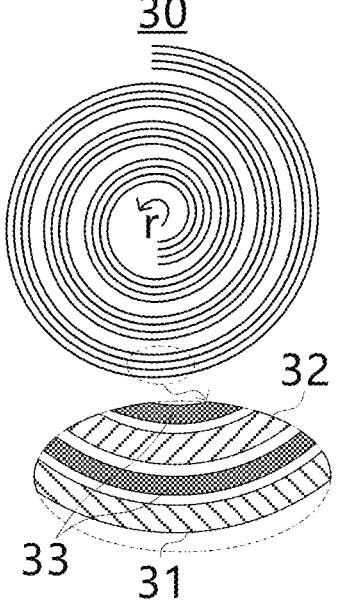
FIG. 4 is a schematic diagram of a winding structure of an electrode assembly according to some embodiments of this disclosure.

FIG. 4 is a schematic diagram of a winding structure of an electrode assembly according to some embodiments of this disclosure. Referring to FIG. 4, in some embodiments, the electrode assembly includes: a positive electrode plate 31, a negative electrode plate 32, and a separator 33 disposed between the positive electrode plate 31 and the negative electrode plate 32. The positive electrode plate 31, the separator 33, and the negative electrode plate 32 are wound along a winding direction r to form a winding structure. The winding structure shown in FIG. 3 forms a cylindrical structure (for example, a hollow cylindrical structure) after winding. Correspondingly, the housing used for the battery cell including the electrode assembly is a cylindrical housing.

The operation of the electrode assembly 30 is achieved by the movement of metal ions between the positive electrode plate and the negative electrode plate. The separator 33 may be made of PP (polypropylene, polypropylene), PE (polyethylene, polyethylene), or the like. The electrolyte includes an electrolytic salt and a solvent. The electrolytic salt may be organic metal salt, inorganic salt, or the like, and can provide metal ions that can migrate between the positive electrode plate and the negative electrode plate.

The negative electrode plate 32 includes a negative electrode current collector substrate and a negative electrode active material layer. A negative electrode tab is connected to the negative electrode current collector substrate. A lithium-ion battery is used as an example. A negative electrode current collector substrate may be made of copper, and a negative electrode active material may be a substance capable of storing lithium ions, for example, graphite, silicon, or lithium titanate. For a case that the negative electrode current collector substrate and the negative electrode active material layer are adhered using an adhesive substance, the adhesive substance may be carboxymethyl cellulose, epoxy resin, styrene butadiene rubber, or the like.

Figure 5:
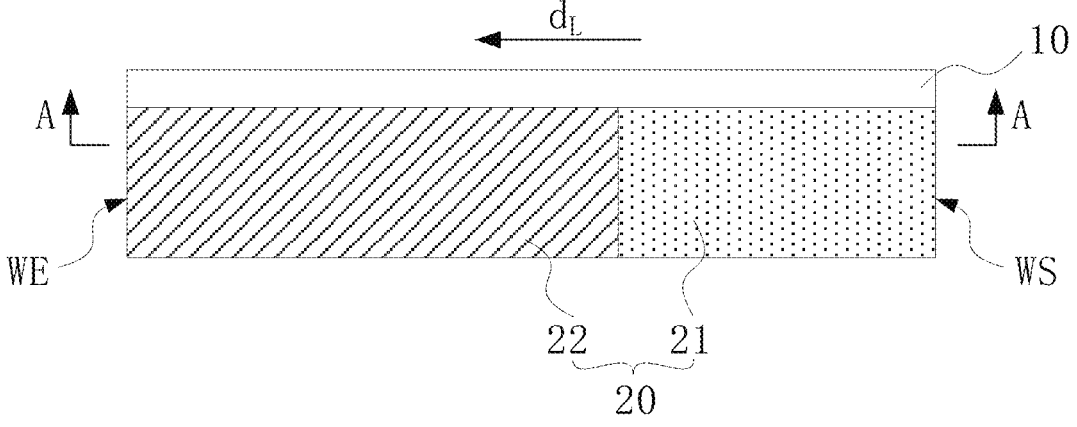
FIG. 5 is a schematic structural diagram of a positive electrode plate in an unfolded state according to some embodiments of this disclosure.
Figure 6:
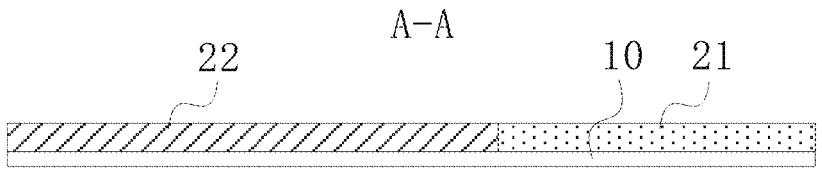
FIG. 6 is a schematic cross-sectional view of FIG. 5 along A-A.
Figure 7:
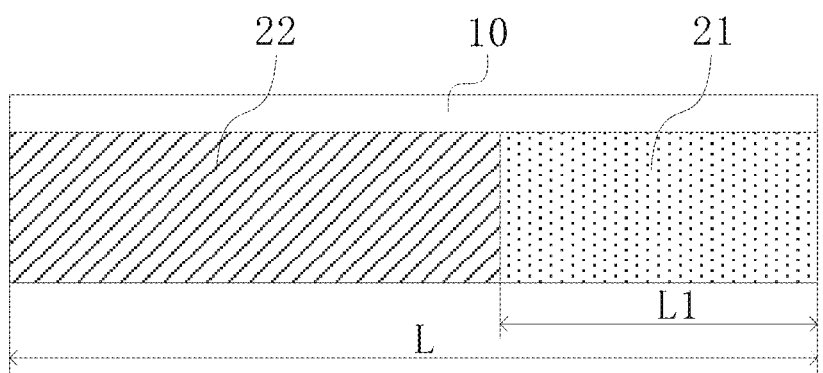
FIG. 7 is a schematic dimension diagram of FIG. 5.

FIG. 5 is a schematic structural diagram of a positive electrode plate in an unfolded state according to some embodiments of this disclosure. FIG. 6 is a schematic cross-sectional view of FIG. 5 along A-A. FIG. 7 is a schematic dimension diagram of FIG. 5. Referring to FIGS. 5 and 6, in some embodiments, the positive electrode plate 31 includes a positive electrode current collector 10 and a positive electrode active material layer 20. A lithium-ion battery is used as an example. The positive electrode current collector 10 may be made of aluminum, and the positive electrode active material contained in the positive electrode active material layer 20 may be a lithiated substance that can provide lithium ions, such as lithium cobalt oxide, lithium iron phosphate, ternary lithium, or lithium manganese oxide.

The positive electrode active material layer 20 is disposed on at least a part of a surface of the positive electrode current collector 10. For example, the positive electrode active material layer 20 may be bonded to the surface of the positive electrode current collector 10 using PVDF (Poly-vinylidene Fluoride, polyvinylidene fluoride) or the like. A positive electrode tab may be connected to or formed on the positive electrode current collector.

The positive electrode active material layer 20 includes at least two positive electrode active material segments arranged along a length direction du of the positive electrode current collector 10, and a specific surface area of a positive electrode active material contained in a part of the at least two positive electrode active material segments is greater than a specific surface area of a positive electrode active material contained in another part of the at least two positive electrode active material segments.

Depending on the compression on different parts of the positive electrode plate 31 when the battery cell swells during operation, the specific surface area of the positive electrode active material contained in a part of the positive electrode active material segments in the positive electrode active material layer 20 is made larger to improve the electrolyte infiltration capacity of the positive electrode active material region with high compression, and reduce the risk of lithium precipitation caused by the electrolyte being squeezed out. This allows the electrolyte to fully react with the positive electrode active material on the positive electrode plate 31 during the charge and discharge process of the battery, thereby optimizing the cycling performance of the battery and improving the safety of the battery.

Herein, the at least two positive electrode active material segments may be arranged continuously or spaced apart along the length direction $d_L$ of the positive electrode current collector 10. The part and the another part of the positive electrode active material segments mentioned herein may be or may not be all of the positive electrode active material segments.

In the embodiments of this disclosure, the specific surface area of the positive electrode active material has a meaning well known in the art, and can be measured using a common instrument and method in the art. For example, it may be measured using the nitrogen-adsorption specific surface area analysis method and calculated using the BET (Brunauer Emmett Teller) method according to the GB/T 19587-2017 standard "Determination of specific surface area of solid substances by gas adsorption BET method", where the nitrogen-adsorption specific surface area analysis test may be carried out using a Tri StarII 3020 specific surface area and aperture analyzer made by Micromeritics in the United States.

Referring to FIGS. 5 and 6, in some embodiments, the at least two positive electrode active material segments include a first positive electrode active material segment 21 and a second positive electrode active material segment 22, a specific surface area $BET_1$ of a first positive electrode active material contained in the first positive electrode active material segment 21 is greater than a specific surface area $BET_2$ of a second positive electrode active material contained in the second positive electrode active material segment 22, and the first positive electrode active material segment 21 is closer to a winding starting end WS of the positive electrode plate 31 than the second positive electrode active material segment 22.

In FIG. 5, the winding starting end WS of the positive electrode plate 31 is an inner end portion of the positive electrode plate 31 wound along the winding direction r in the electrode assembly 30 in FIG. 4, and an winding terminating end WE is an outer end portion of the positive electrode plate 31 wound along the winding direction r in the electrode assembly 30 in FIG. 4.

Considering that when the positive electrode plate 31 is applied to a wound electrode assembly, the electrode plate layer closer to the winding center is more severely compressed by swelling of the battery cell during operation, the specific surface area of the first positive electrode active material contained in the first positive electrode active material segment 21 closer to the winding starting end WS is made larger to allow for stronger electrolyte infiltration capacity, so that a certain amount of electrolyte can still be retained under high compression. This can reduce the risk of lithium precipitation caused by lack of electrolyte, optimize the cycling performance of the battery, and improve the safety of the battery.

In FIGS. 5 and 6, an end portion of the first positive electrode active material segment 21 adjacent to the winding starting end WS of the positive electrode plate 31 may be flush with the winding starting end WS of the positive electrode plate 31. That is, the first positive electrode active material segment 21 starts to be bonded to and cover the positive electrode current collector 10 from the winding starting end WS of the positive electrode plate 31. In this way, it is unnecessary to accurately set the coating position of the first positive electrode active material segment 21 on a side near the winding starting end WS, helping to reduce the difficulty in forming the first positive electrode active material segment 21 on the positive electrode current collector 10 by coating.

Figure 8:
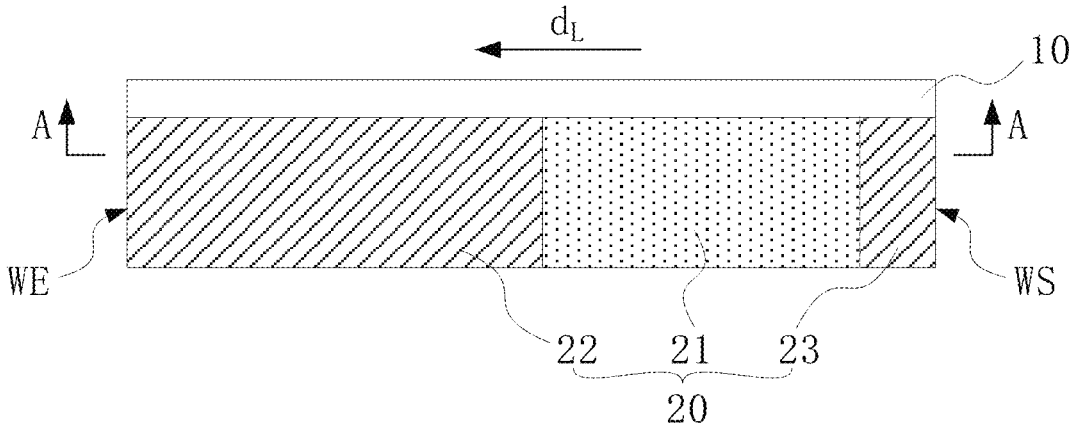
FIG. 8 is a schematic structural diagram of a positive electrode plate in an unfolded state according to some other embodiments of this disclosure.
Figure 9:
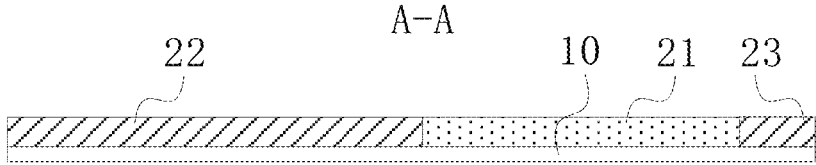
FIG. 9 is a schematic cross-sectional view of FIG. 8 along A-A.
Figure 10:
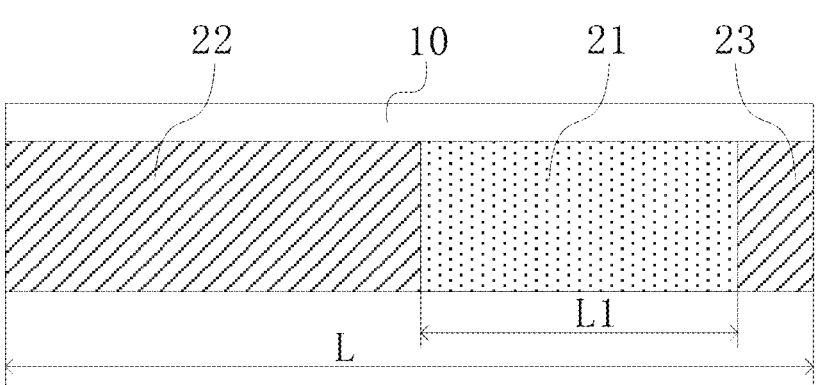
FIG. 10 is a schematic dimension diagram of FIG. 8.

FIG. 8 is a schematic structural diagram of a positive electrode plate in an unfolded state according to some other embodiments of this disclosure. FIG. 9 is a schematic cross-sectional view of FIG. 8 along A-A. FIG. 10 is a schematic dimension diagram of FIG. 8. Referring to FIGS. 8 and 9, in some embodiments, the at least two positive electrode active material segments further include a third positive electrode active material segment 23, the third positive electrode active material segment 23 is located on a side of the first positive electrode active material segment 21 far from the second positive electrode active material segment 22, and the specific surface area $BET_1$ of the first positive electrode active material contained in the first positive electrode active material segment 21 is greater than a specific surface area $BET_3$ of a third positive electrode active material contained in the third positive electrode active material segment 23.

Considering that some wound electrode assemblies have a hollow structure in the positive electrode plate 31, the electrode plate segment near the center position is less compressed when the battery cell swells during operation. Therefore, with the first positive electrode active material with a relatively small specific surface area disposed on the side of the first positive electrode active material segment 21 close to the winding starting end WS, it is conducive to reducing the cost by reducing the amount of the first positive electrode active material used.

In FIGS. 8 and 9, the third positive electrode active material contained in the third positive electrode active material segment 23 may be the same as the second positive electrode active material contained in the second positive electrode active material segment 22, which is equivalent to using the same positive electrode active material with a larger specific surface area to form the second positive electrode active material segment 22 and the third positive electrode active material segment 23 respectively on two sides of the first positive electrode active material segment 21 along the length direction du of the positive electrode plate 31, thereby simplifying the electrode plate processing procedures.

Referring to FIGS. 7 and 10, in some embodiments, in the length direction $d_L$ of the positive electrode current collector 10, a ratio L1/L of a length L1 of the first positive electrode active material segment 21 to a length L of the positive electrode current collector 10 satisfies: 0<L1/L≤0.5.

L1/L corresponds to a coverage proportion of the positive electrode active material in the length direction du of the entire positive electrode current collector 10. If this proportion is too low, the improvement to the electrolyte infiltration capacity is limited, and the risk of lithium precipitation due to the electrolyte being squeezed out cannot be effectively reduced. If this proportion is too high, a larger amount of the first positive electrode active material is needed, which is likely to cause high costs. With L1/L satisfying 0<L1/L≤0.5, the risk of lithium precipitation on the electrode plate is reduced, the cycling performance of the battery is optimized, and the overall cost is reduced.

Further, the ratio L1/L may satisfy: 0.3≤L1/L≤0.5, for example, L1/L is set to 0.3, ⅓, 0.35, 0.4, 0.45, or the like. With L1/L further satisfying 0.3≤L1/L≤0.5, the risk of lithium precipitation on the electrode plate can be more effectively reduced, the cycling performance of the battery can be optimized, and the overall cost can be reduced.

The first positive electrode active material and the second positive electrode active material may be the same active material or different active materials. In some embodiments, the first positive electrode active material includes nano lithium iron phosphate, and the second positive electrode active material includes lithium iron phosphate. Although nano lithium iron phosphate and lithium iron phosphate have differences in specific surface area, particle size, and the like, they belong to the same type of active material, which can prevent excessive performance differences between the first positive electrode active material segment 21 and the second positive electrode active material segment 22 of the positive electrode plate 31 from affecting the overall performance of the electrode assembly.

In other embodiments, the second positive electrode active material is lithium iron phosphate, and the first positive electrode active material may be ternary lithium, lithium-rich manganese-based material, M3P material, or the like. Alternatively, both the first positive electrode active material and the second positive electrode active material may be lithium iron phosphate, and a specific surface area of the lithium iron phosphate used for the first positive electrode active material is greater than a specific surface area of the lithium iron phosphate used for the second positive electrode active material. Still alternatively, both the first positive electrode active material and the second positive electrode active material may be nano lithium iron phosphate, and a specific surface area of the nano lithium iron phosphate used for the first positive electrode active material is greater than a specific surface area of the nano lithium iron phosphate used for the second positive electrode active material.

In the above embodiments, the specific surface area $BET_1$ of the first positive electrode active material may satisfy: $BET_1 \geq 12$ m²/g. With the specific surface area $BET_1$ of the first positive electrode active material greater than or equal to 12 m²/g, the material pores of the first positive electrode active material with a relatively large specific surface area can accommodate more electrolyte during the cycling process, which helps to alleviate the difficulty of insufficient infiltration, reduce the risk of lithium precipitation, and improve the cycle life of the battery.

Further, the specific surface area $BET_1$ of the first positive electrode active material may satisfy: 14 m²/g≤$BET_1$≤23 m²/g, for example, $BET_1$ is set to 14 m²/g, 16 m²/g, 19 m²/g, 21 m²/g, or 23 m²/g. With the specific surface area $BET_1$ of the first positive electrode active material satisfying the further preferred range of 14 m²/g≤$BET_1$≤23 m²/g, it is possible to improve the stability of the positive electrode active material while improving the cycle life of the battery, thereby enhancing the safety performance of the battery.

In some embodiments, the specific surface area $BET_2$ of the second positive electrode active material satisfies: $BET_2$<12 m²/g. With the specific surface area $BET_2$ of the second positive electrode active material less than 12 m²/g, it is conducive to using a positive electrode active material with a smaller specific surface area and lower cost to form the second positive electrode active material segment 22, thereby reducing the overall cost of the positive electrode plate 31.

Further, the specific surface area $BET_2$ of the second positive electrode active material satisfies: 2 m²g≤$BET_2$≤10 m²/g, for example, $BET_2$ is set to 2 m²/g, 4 m²/g, 6 m²/g, 8 m²/g, or 10 m²/g. With the specific surface area $BET_2$ of the second positive electrode active material satisfying the further preferred range of 2 m²/g≤$BET_2$≤10 m²/g, the overall cost of the positive electrode plate 31 can be effectively reduced.

In some other embodiments, on a basis that the specific surface area $BET_1$ of the first positive electrode active material is greater than the specific surface area $BET_2$ of the second positive electrode active material, the specific surface area $BET_1$ of the first positive electrode active material may also be less than 12 m²/g, or the specific surface area $BET_2$ of the second positive electrode active material may also be greater than 12 m²/g.

In the above embodiments, a median particle size $D_v50_1$ of the first positive electrode active material may be less than a median particle size $D_v50_2$ of the second positive electrode active material. Considering that when the positive electrode plate 31 is applied to a wound electrode assembly, the electrode plate layer closer to the winding center is more severely compressed by swelling of the battery cell during operation, the median particle size of the first positive electrode active material contained in the first positive electrode active material segment 21 closer to the winding starting end WS is made larger to allow for stronger electrolyte infiltration capacity, so that a certain amount of electrolyte can still be retained under high compression. This can reduce the risk of lithium precipitation caused by lack of electrolyte, and optimize the cycling performance of the battery.

In the embodiments of this disclosure, the median particle size $D_v50$ of the positive electrode active material has a meaning well known in the art and can be measured using a common instrument and method in the art. For example, the median particle size can be easily measured in accordance with GB/T 19077-2016 particle size distribution laser diffraction method by using a laser particle size analyzer, for example, a laser particle size analyzer of Mastersizer 2000E from Malvern Instruments Ltd. of UK.

In some embodiments, the median particle size $D_v50_1$ of the first positive electrode active material satisfies: $D_v50_1 \leq 800$ nm. With the median particle size $D_v50_1$ of the first positive electrode active material less than or equal to 800 nm, the material pores of the first positive electrode active material with a relatively small median particle size can accommodate more electrolyte during the cycling process, which helps to alleviate the difficulty of insufficient infiltration, reduce the risk of lithium precipitation, and improve the cycle life of the battery.

Further, the median particle size $D_v50_1$ of the first positive electrode active material may satisfy: 100 nm$\leq D_v50_1 \leq 3400$ nm, for example, $D_v50_1$ may be set to 100 nm, 160 nm, 210 nm, 280 nm, 340 nm, 400 nm, or the like. With the median particle size $D_v50_1$ of the first positive electrode active material satisfying the further preferred range of 100 nm$\leq D_v50_1 \leq 400$ nm, it is possible to alleviate the local lithium precipitation and improve the cycle life of the battery, as well as improving the electrochemical kinetics performance during the charge and discharge process of the battery and reducing polarization.

In some embodiments, the median particle size $D_v50_2$ of the second positive electrode active material satisfies: $D_v50_2 > 800$ nm. With the median particle size $D_v50_2$ of the second positive electrode active material greater than 800 nm, it is conducive to using a positive electrode active material with a relatively large median particle size and low cost to form the second positive electrode active material segment 22, thereby reducing the overall cost of the positive electrode plate 31.

Further, the median particle size $D_v50_2$ of the second positive electrode active material satisfies: 900 nm$\leq D_v50_2 \leq 1500$ nm, for example, $D_v50_2$ may be set to 900 nm, 1000 nm, 1150 nm, 1280 nm, 1360 nm, 1500 nm, or the like. With the median particle size $D_v50_2$ of the second positive electrode active material satisfying the further preferred range of 900 nm$\leq D_v50_2 \leq 1500$ nm, the overall cost of the positive electrode plate 31 can be effectively reduced.

In some other embodiments, on a basis that the median particle size $D_v50_1$ of the first positive electrode active material is less than the median particle size $D_v50_2$ of the second positive electrode active material, the median particle size $D_v50_1$ of the first positive electrode active material may also be greater than 800 nm, or the median particle size $D_v50_2$ of the second positive electrode active material may also be less than 800 nm.

In the above embodiments, a carbon content $\omega C_1$ of the first positive electrode active material may be greater than a carbon content $\omega C_2$ of the second positive electrode active material. Considering that when the positive electrode plate 31 is applied to a wound electrode assembly, the electrode plate layer closer to the winding center is more severely compressed by swelling of the battery cell during operation, lithium precipitation is likely to occur. The carbon content of the first positive electrode active material contained in the first positive electrode active material segment 21 closer to the winding starting end WS is made larger, thereby improving the conductivity of the electrode plate, reducing the risk of lithium precipitation, and optimizing the charge-discharge performance of the battery.

In the embodiments of this disclosure, the content of element carbon in the positive electrode active material can be measured using a common instrument and method in the art. For example, a high-frequency carbon-sulfur analyzer can be used for testing according to the infrared absorption method. The carbon and sulfur elements in the positive electrode active material are oxidized into carbon dioxide and sulfur dioxide gases at high temperature. After treated, the gases enter the corresponding absorption cells for infrared radiation absorption. After signal conversion, the test results of the element carbon content are output.

In some embodiments, the carbon content $\omega C_1$ of the first positive electrode active material may satisfy: $\omega C_1 \leq 2.5\%$. With the carbon content $\omega C_1$ of the first positive electrode active material greater than or equal to 2.5%, the first positive electrode active material with a relatively high carbon content can achieve high conductivity, which helps to reduce the risk of lithium precipitation, improve the cycle life of the battery, reduce the internal resistance of the battery, and enhance the cycling performance of the battery.

Further, the carbon content $\omega C_1$ of the first positive electrode active material satisfies: $\omega C_1 \geq 2.8\%$, for example, $\omega C_1$ may be set to 2.8%, 2.9%, 3.2%, 4.0%, or the like. With the carbon content $\omega C_1$ of the first positive electrode active material satisfying the further preferred range of $\omega C_1 \geq 2.8\%$, the conductivity of the electrode plate can be further effectively improved, the internal resistance of the battery can be reduced, and the cycle life of the battery can be improved.

In some embodiments, the carbon content $\omega C_2$ of the second positive electrode active material satisfies: $\omega C_2 \leq 1.5\%$. With the carbon content $\omega C_2$ of the second positive electrode active material less than or equal to 1.5%, the proportion of the positive electrode active material can be increased, and the energy density can be improved.

Further, the carbon content $\omega C_2$ of the second positive electrode active material may satisfy: $\omega C_2 \leq 1.2\%$, for example, $\omega C_2$ may be set to 1.2%, 1%, 0.8%, 0.5%, or the like. With the carbon content $\omega C_2$ of the second positive electrode active material further satisfying $\omega C_2 \leq 1.2\%$, the proportion of the positive electrode active material can be effectively increased, and the energy density can be improved.

In some other embodiments, on a basis that the carbon content $\omega C_1$ of the first positive electrode active material is greater than the carbon content $\omega C_2$ of the second positive electrode active material, the carbon content $\omega C_1$ of the first positive electrode active material may also be less than 2.5%, or the carbon content $\omega C_2$ of the second positive electrode active material may also be greater than 1.5%.

In the above embodiments, for the embodiment of the positive electrode plate including the third positive electrode active material segment, for the type and parameters of the third positive electrode active material in the third positive electrode active material segment, reference may be made to the first positive electrode active material, and details are not described herein.

The following table describes the test results of multiple examples and comparative examples of the positive electrode plate. The process for testing the direct current resistance (Direct Current Resistance, DCR) herein includes: charging the battery at 1 C at room temperature, discharging it to 50% SOC at 1 C, adjusting the ambient temperature for the battery to −10° C., leaving it standing for 2 hours, discharging it at 3 C for 10s, and obtaining the direct-current internal resistance of the battery by calculating a ratio of (voltage before discharge-voltage after discharge) to current. The process for testing whether there is lithium precipitation in the inner turn includes: at room temperature, charging the battery at 1 C and discharging it at 1 C, and at the 2000th cycle, disassembling the battery, and observing whether there is lithium precipitation on the surface of the electrode plate in the inner turn of the battery. The cycle life test herein includes: at room temperature, keeping charging the battery at 1 C and discharging at 1 C until the battery capacity decays to 80% SOH, at which point the number of cycles is the cycle life of the battery.

TABLE 1A

| | First positive electrode active material | $BET_1$ $(m^2/g)$ | $D_v50_1$ (nm) | $\omega C_1$ (%) |
|---|---|---|---|---|
| Example 1 | Nano lithium iron phosphate | 12.1 | 400 | 2.9 |
| Example 2 | Nano lithium iron phosphate | 14.0 | 400 | 2.9 |
| Example 3 | Nano lithium iron phosphate | 16.8 | 400 | 2.9 |
| Example 4 | Nano lithium iron phosphate | 16.8 | 220 | 2.9 |
| Example 5 | Nano lithium iron phosphate | 16.8 | 80 | 2.9 |
| Example 6 | Nano lithium iron phosphate | 16.8 | 400 | 2.6 |
| Example 7 | Nano lithium iron phosphate | 16.8 | 400 | 2.9 |
| Example 8 | Nano lithium iron phosphate | 16.8 | 400 | 2.9 |
| Example 9 | Nano lithium iron phosphate | 16.8 | 400 | 2.9 |
| Example 10 | Nano lithium iron phosphate | 16.8 | 400 | 2.9 |
| Example 11 | Nano lithium iron phosphate | 16.8 | 400 | 2.9 |
| Comparative example | Lithium iron phosphate | 9.8 | 1050 | 1.5 |

TABLE 1B

| | Second positive electrode active material | $BET_2$ $(m^2/g)$ | $D_v50_2$ (nm) | $\omega C_2$ (%) |
|---|---|---|---|---|
| Example 1 | Lithium iron phosphate | 9.8 | 1050 | 1.5 |
| Example 2 | Lithium iron phosphate | 9.8 | 1050 | 1.5 |
| Example 3 | Lithium iron phosphate | 9.8 | 1050 | 1.5 |
| Example 4 | Lithium iron phosphate | 9.8 | 1050 | 1.5 |
| Example 5 | Lithium iron phosphate | 9.8 | 1050 | 1.5 |
| Example 6 | Lithium iron phosphate | 9.8 | 1050 | 1.5 |
| Example 7 | Lithium iron phosphate | 9.8 | 1050 | 1.5 |
| Example 8 | Lithium iron phosphate | 9.8 | 1050 | 1.5 |
| Example 9 | Lithium iron phosphate | 5.2 | 1050 | 1.5 |
| Example 10 | Lithium iron phosphate | 9.8 | 1800 | 1.5 |
| Example 11 | Lithium iron phosphate | 9.8 | 1050 | 1.2 |
| Comparative example | Lithium iron phosphate | 9.8 | 1050 | 1.5 |

TABLE 1C

| | L1/L | Direct-current internal resistance $(m\Omega)$ | Lithium precipitation in inner turn | Cycle life (cycles) |
|---|---|---|---|---|
| Example 1 | 0.30 | 14 | Slight | 3700 |
| Example 2 | 0.30 | 12 | None | 4200 |
| Example 3 | 0.30 | 6 | None | 5400 |
| Example 4 | 0.30 | 6 | None | 5400 |
| Example 5 | 0.30 | 10 | None | 3880 |
| Example 6 | 0.30 | 8 | None | 5400 |
| Example 7 | 0.05 | 15 | Slight | 3800 |
| Example 8 | 0.50 | 6 | None | 5200 |
| Example 9 | 0.30 | 9 | None | 4400 |
| Example 10 | 0.30 | 9 | None | 4400 |
| Example 11 | 0.30 | 4.2 | None | 5800 |
| Comparative example | | 16.5 | Severe | 3000 |

From the above table, it can be seen that in Examples 1 to 3, when nano lithium iron phosphate with a specific surface area greater than 10 $m^2/g$ is used as the first positive electrode active material and lithium iron phosphate with a specific surface area less than 10 $m^2/g$ is used as the second positive electrode active material to form the first positive electrode active material segment and the second positive electrode active material segment of the positive electrode plate respectively, the direct-current internal resistance is relatively small, only slight or no lithium precipitation occurs at the 2000th cycle, and the cycle life obtained from the cycling test can reach more than 3700 cycles. In the comparative examples, when lithium iron phosphate with a specific surface area greater than 10 $m^2/g$ is used as both the first positive electrode active material and the second positive electrode active material to form the first positive electrode active material segment and the second positive electrode active material segment of the positive electrode plate respectively, the direct-current internal resistance is relatively large, severe lithium precipitation occurs in the inner turn at the 2000th cycle, and the cycle life obtained from the cycling test is only 3000 cycles. Moreover, compared to Example 1, the specific surface area $BET_1$ of the first positive electrode active material in Examples 2 and 3 is larger, and correspondingly, the internal resistance is smaller, lithium precipitation is better alleviated, and the cycle life reaches more than 4200 cycles.

From the above table, it can be seen that in Examples 3 to 5, when nano lithium iron phosphate with a median particle size less than 800 nm is used as the first positive electrode active material and lithium iron phosphate with a median particle size greater than 800 nm is used as the second positive electrode active material to form the first positive electrode active material segment and the second positive electrode active material segment of the positive electrode plate respectively, the direct-current internal resistance is relatively small, no lithium precipitation occurs in the inner turn at the 2000th cycle, and the cycle life obtained from the cycling test is more than 3800 cycles. In the comparative examples, when lithium iron phosphate with a median particle size greater than 800 nm is used as both the first positive electrode active material and the second positive electrode active material to form the first positive electrode active material segment and the second positive electrode active material segment of the positive electrode plate respectively, the direct-current internal resistance is relatively large, severe lithium precipitation occurs in the inner turn at the 2000th cycle, and the cycle life obtained from the cycling test is only 3000 cycles. Compared to Example 5, the median particle size $D_v 50_1$ of the first positive electrode active material in Examples 3 and 4 is in the range of 100-400 nm, and correspondingly, the internal resistance is smaller, and the cycle life reaches more than 5400 cycles.

From the above table, it can be seen that in Examples 3 and 6, when nano lithium iron phosphate with a carbon content greater than 2.5% is used as the first positive electrode active material and lithium iron phosphate with a carbon content less than or equal to 1.5% is used as the second positive electrode active material to form the first positive electrode active material segment and the second positive electrode active material segment of the positive electrode plate respectively, the direct-current internal resistance is relatively small, no lithium precipitation occurs the inner turn at the 2000th cycle, and the cycle life obtained from the cycling test reaches more than 5000 cycles. In the comparative examples, when lithium iron phosphate with a carbon content less than or equal to 1.5% is used as both the first positive electrode active material and the second positive electrode active material to form the first positive electrode active material segment and the second positive electrode active material segment of the positive electrode plate respectively, the direct-current internal resistance is relatively large, severe lithium precipitation occurs in the inner turn at the 2000th cycle, and the cycle life obtained from the cycling test is only 3000 cycles.

From the above table, it can be seen that in Examples 3, 7, and 8, the ratio L1/L of the length L1 of the first positive electrode active material segment to the length L of the positive electrode current collector satisfies the range of $0 < L1/L \leq 0.5$, the direct-current internal resistance is relatively small, only slight or no lithium precipitation occurs at the 2000th cycle, and the cycle life obtained from the cycling test reaches more than 3800 cycles. In the comparative example, both the first positive electrode active material segment and the second positive electrode active material segment contains lithium iron phosphate but no nano lithium iron phosphate, so L1/L in this case is equivalent to 0. In this case, the direct-current internal resistance is relatively large, severe lithium precipitation occurs in the inner turn at the 2000th cycle, and the cycle life obtained from the cycling test is only 3000 cycles. Moreover, compared to Example 7, the L1/L values in Examples 3 and 8 are in the range of 0.3-0.5, and correspondingly, the internal resistance is smaller, lithium precipitation is better alleviated, and the cycle life reaches more than 5200 cycles.

From the above table, it can be seen that in Examples 3, 9, 10, and 11, nano lithium iron phosphate with a specific surface area $BET_1$ greater than 10 $m^2/g$, a median particle size $D_v 50_1$ less than 800 nm, and a carbon content $\omega C_1$ greater than 2.5% is used as the first positive electrode active material. In Examples 9, 10, and 11, different values are taken for the specific surface area $BET_2$, median particle size $D_v 50_2$, and carbon content $\omega C_2$ of the second positive electrode active material as compared to Example 3. It can be seen that with the specific surface area $BET_2$ less than 12 $m^2/g$, the median particle size $D_v 50_2$ greater than 800 nm, and the carbon content $\omega C_2$ less than or equal to 1.2%, the direct-current internal resistance is relatively small, no lithium precipitation occurs in the inner turn at the 2000th cycle, and the cycle life obtained from the cycling test reaches more than 4400 cycles.

FIG. 11 is a schematic flowchart of a preparation method of positive electrode plate according to some embodiments of this disclosure. Referring to FIG. 11, in some embodiments, the preparation method of the positive electrode plate includes step S1 and step S2. In step S1, provide a positive electrode current collector, a first positive electrode slurry containing a first positive electrode active material, and a second positive electrode slurry containing a second positive electrode active material, where a specific surface area of the first positive electrode active material is greater than a specific surface area of the second positive electrode active material.

In step S2, apply the first positive electrode slurry to a surface of a part of at least two segments arranged along a length direction of the positive electrode current collector, and apply the second positive electrode slurry to a surface of another part of the at least two segments arranged along the length direction of the positive electrode current collector.

The first positive electrode slurry containing the first positive electrode active material and the second positive electrode slurry containing the second positive electrode active material are applied to surfaces of different segments of the positive electrode current collector in the length direction, so that the resulting positive electrode plate can improve the electrolyte infiltration capacity of the positive electrode active material region with high compression, and reduce the risk of lithium precipitation caused by the electrolyte being squeezing out. This allows the electrolyte to fully react with the positive electrode active material on the positive electrode plate during the charge and discharge process of the battery, thereby optimizing the cycling performance of the battery and improving the safety of the battery.

Herein, the at least two segments can be arranged continuously or spaced apart along the length direction of the positive electrode current collector. The part and the another part of the segments mentioned herein may be or may not be all of the segments.

For example, during preparation of the positive electrode plate, nano lithium iron phosphate with a median particle size of 780 nm and a specific surface area of 14.4 $m^2/g$ as the first positive electrode active material, a conductive agent (acetylene black), and a binder (polyvinylidene fluoride PVDF) are dissolved in a solvent N-methylpyrrolidone (NMP) at a mass ratio of 97:0.8:2.2, followed by thorough stirring and mixing, to produce a uniform first positive electrode slurry.

Lithium iron phosphate with a median particle size of 1050 nm and a specific surface area of 9.8 $m^2/g$ as the second positive electrode active material, a conductive agent (acetylene black), and a binder (polyvinylidene fluoride PVDF) are dissolved in a solvent N-methylpyrrolidone (NMP) at a mass ratio of 97:0.8:2.2, followed by thorough stirring and mixing, to produce a uniform second positive electrode slurry.

Then, referring to FIG. 5, the first positive electrode slurry is uniformly applied from the winding starting end WS along the length direction $d_L$ to the surface of the positive electrode current collector (aluminum foil), with a coating length being ⅓ of the entire electrode plate length. The second positive electrode slurry is uniformly applied to the surface of the positive electrode current collector (aluminum foil), with a coating length being ⅔ of the entire electrode plate length. Then drying, cold pressing, and slitting are performed to obtain the positive electrode plate.

Based on the above embodiments of the positive electrode plate in this disclosure, some embodiments of this disclosure further provide an electrode assembly including the positive electrode plate according to any one of the above embodiments, and further including a negative electrode plate and a separator disposed between the positive electrode plate and the negative electrode plate, where the positive electrode plate, the separator, and the negative electrode plate are wound along a winding direction to form a winding structure. The electrode assembly using the foregoing positive electrode plate has better cycling performance and safety.

In some embodiments, the winding structure is a cylindrical structure. For a cylindrical electrode assembly, the foregoing positive electrode plate can improve the electrolyte infiltration effect at the positions with concentrated swelling force, thereby enhancing the cycling performance and safety of the electrode assembly.

According to an aspect of this disclosure, a battery cell is provided, including the electrode assembly according to any one of the above embodiments. The battery cell using the foregoing electrode assembly has better cycling performance and safety.

According to an aspect of this disclosure, a battery is provided, including the battery cell according to any one of the above embodiments. The battery using the foregoing battery cell has better cycling performance and safety.

According to an aspect of this disclosure, an electric device is provided, including the battery according to any one of the above embodiments. The electric device using the foregoing battery can achieve better safety and reduced battery consumption.

Although this disclosure has been described with reference to some preferred embodiments, various modifications to this disclosure and replacements of the components therein with equivalents can be made without departing from the scope of this disclosure. In particular, as long as there is no structural conflict, the various technical features mentioned in the embodiments can be combined in any manner. This disclosure is not limited to the specific embodiments disclosed in this specification, but includes all technical solutions falling within the scope of the claims.

What is claimed is:

1. A positive electrode plate, comprising:
a positive electrode current collector; and
a positive electrode active material layer, disposed on a surface of the positive electrode current collector;
wherein the positive electrode active material layer comprises two segments of positive electrode active materials arranged along a length direction of the positive electrode current collector, and a specific surface area $BET_1$ of a first positive electrode active material contained in a first segment is greater than a specific surface area $BET_2$ of a second positive electrode active material contained in a second segment;
wherein the first positive electrode active material comprises nano lithium iron phosphate, and the second positive electrode active material comprises lithium iron phosphate;
the median particle size $D_v50_1$ of the first positive electrode active material satisfies:
100 nm$\leq D_v50_1\leq$400 nm; and
the median particle size $D_v50_2$ of the second positive electrode active material satisfies:
900 nm$\leq D_v50_2\leq$1500 nm;
wherein the positive electrode plate is wound to form a part of a winding structure, and the first segment is located closer to a center of the winding structure than the second segment; and a length L1 of the first segment is 30% to 50% of a total length L of the positive electrode current collector.

2. The positive electrode plate according to claim 1, wherein an end portion of the first segment is flush with the winding starting end of the positive electrode plate.

3. The positive electrode plate according to claim 1, wherein the positive electrode active material layer further comprise a third segment arranged along the length direction of the positive electrode current collector, the third segment is located next to the first segment and is away from the second segment, and the specific surface area $BET_1$ of the first positive electrode active material is greater than a specific surface area $BET_3$ of a third positive electrode active material contained in the third segment.

4. The positive electrode plate according to claim 3, wherein the third positive electrode active material contained in the third segment is the same as the second positive electrode active material contained in the second segment.

5. The positive electrode plate according to claim 1,
wherein the specific surface area $BET_1$ of the first positive electrode active material satisfies: $BET_1\geq12$ m$^2$/g; and
wherein the specific surface area $BET_2$ of the second positive electrode active material satisfies: $BET_2<12$ m$^2$/g.

6. The positive electrode plate according to claim 5, wherein the specific surface area $BET_1$ of the first positive electrode active material satisfies:
14 m$^2$g$\leq BET_1\leq$23 m$^2$/g.

7. The positive electrode plate according to claim 5, wherein the specific surface area $BET_2$ of the second positive electrode active material satisfies:
2 m$^2$/g$\leq BET_2\leq$10 m$^2$/g.

8. The positive electrode plate according to claim 1, wherein a content $\omega C_1$ of a carbon included in the first positive electrode active material with the nano lithium iron phosphate is greater than a content $\omega C_2$ of a carbon included in the second positive electrode active material with the lithium iron phosphate.

9. The positive electrode plate according to claim 8, wherein the content $\omega C_1$ of the carbon included in the first positive electrode active material with the nano lithium iron phosphate is greater than or equal to 2.5%.

10. The positive electrode plate according to claim 8, wherein the content $\omega C_1$ of the carbon included in the first positive electrode active material with the nano lithium iron phosphate is greater than or equal to 1.5%.

11. An electrode assembly, comprising:
a positive electrode plate, a negative electrode plate, and a separator disposed between the positive electrode plate and the negative electrode plate,
wherein the positive electrode plate is the positive electrode plate according to claim 1, and the positive electrode plate, the separator, and the negative electrode plate are wound along a winding direction to form the winding structure.

12. A battery cell, comprising the electrode assembly according to claim 11.

13. A battery, comprising the battery cell according to claim 12.

14. An electric device, comprising the battery according to claim 13.

* * * * *